United States Patent [19]

Councilman

[11] Patent Number: 4,491,285
[45] Date of Patent: Jan. 1, 1985

[54] OSCILLATING SYSTEM RETAINING MEANS

[75] Inventor: Richard R. Councilman, Collinsville, Okla.

[73] Assignee: Brunswick Corporation, Skokie, Ill.

[21] Appl. No.: 469,419

[22] Filed: Feb. 24, 1983

Related U.S. Application Data

[62] Division of Ser. No. 84,719, Oct. 15, 1979.

[51] Int. Cl.³ .............................................. A01K 89/01
[52] U.S. Cl. .............................. 242/84.21 R; 403/136; 411/353; 411/517
[58] Field of Search ................. 242/84.21 R, 84.21 A, 242/844, 158.5; 403/136, 155, DIG. 7, 326; 411/353, 512, 517-522, 523, 529

[56] References Cited

U.S. PATENT DOCUMENTS

| | | | |
|---|---|---|---|
| 2,863,617 | 12/1958 | Chaplin et al. | 242/84.21 R |
| 2,971,720 | 2/1961 | Wood | 242/84.21 R |
| 3,788,570 | 1/1974 | Yamazaki et al. | 242/84.21 R |
| 4,113,397 | 9/1978 | Snyder | 403/326 |

Primary Examiner—Billy S. Taylor
Attorney, Agent, or Firm—John G. Heimovics

[57] ABSTRACT

This invention comprehends a means for coupling an oscillator mechanism of a fishing reel to the spool of the fishing reel so that the spool will reciprocate back and forth as the fishing line is wound thereon. The spool shaft is received in a mounting mechanism associated with the yoke strap cam follower portion of the oscillating mechanism. An undercut groove on the shaft facilitates its fastening to the yoke strap.

7 Claims, 10 Drawing Figures

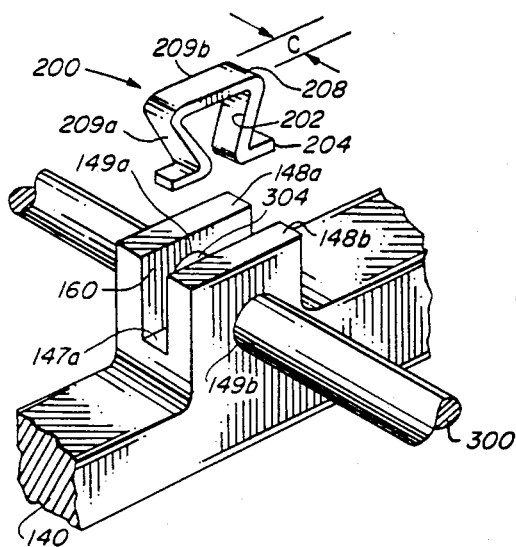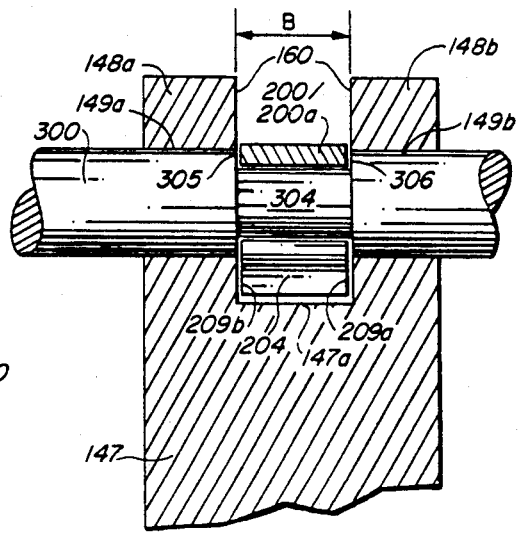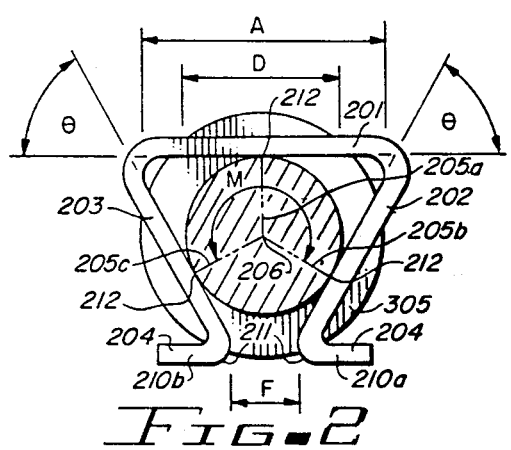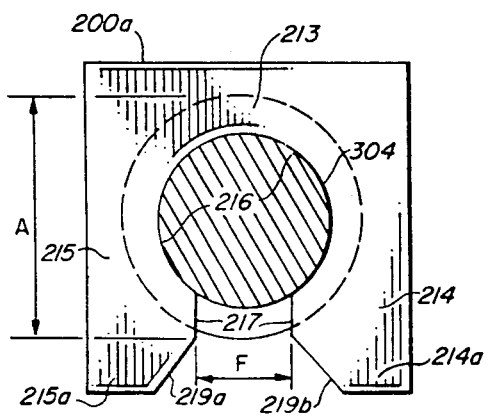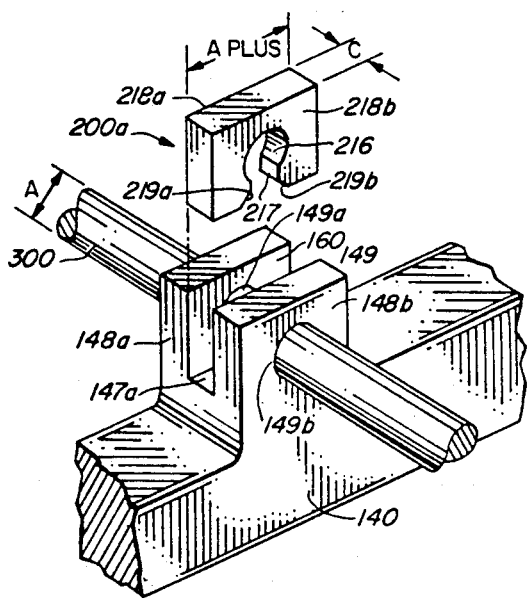

OSCILLATING SYSTEM RETAINING MEANS

This application is a division of Ser. No. 84,719, filed 10/15/79.

BACKGROUND OF THE INVENTION

1. Field of the Invention

This invention relates to fishing reels, and more particularly, relates to a simple means of securing the central spool shaft of a fishing reel to an oscillator slide that imparts reciprocating motion to the spool shaft.

2. Background of the Prior Art

It has been customary in the better open face fishing reels to cause the spool attached to the spool shaft to oscillate or reciprocate back and forth as the fishing line is being wound on the spool. One method of imparting such reciprocating motion is taught in U.S. Pat. No. 2,863,617 wherein a center shaft has a pair of spaced circular grooves which cooperate with a yoke member that is secured to the inside face of the drive gear. In another much better method, taught in U.S. Pat. No. 4,266,739, a dual C-shaped retainer clip secures an oscillator slide that is driven by an eccentric pin on the face of the oscillator gear to the center spool shaft. In both teachings, the oscillator mechanism pushes on the outside area of the clip means which is made from very thin sheet metal stock. These thin clips have only the thickness of the metal, from which they are formed, to withstand the shearing action between the dual grooves (in the shaft) and the oscillator means. It has been observed that a much thicker shear piece and a single groove in the spool shaft would be much more advantageous, but such an arrangement does not seem to be available in current fishing reels.

SUMMARY OF THE INVENTION

This invention relates to a spinning style fishing reel that incorporates a cam oscillator mechanism to cause the center spool shaft to reciprocate forward and backward and comprehends a means for coupling the oscillator mechanism to the spool shaft. The coupling means comprises a single clip of substantial thickness that snaps over an undercut groove in the spool shaft.

It is therefore an object of invention to provide a simple and full proof means of coupling the oscillator slide part of the oscillator mechanism to the spool shaft.

It is another object of this invention to provide such a coupling means that comprises a flat spring clip.

Yet another object of this invention is to provide such a coupling means that comprises a small block of plastic fashioned into the shape of a clip.

It is another object of this invention to provide such a clip means that has a sufficient thickness that cannot be sheared apart such as the clips of the prior art.

It is yet another object of this invention to provide such a clip that is positioned between the clevis of the oscillator providing two axial shearing surfaces.

It is still another object of the invention to provide such a coupling means that utilizes an undercut portion on the spool shaft and a strap securable to the oscillator means.

The above and other and further objects and features will be more readily understood by reference to the following detailed description and the accompanying drawings.

DESCRIPTION OF THE DRAWINGS

FIG. 2 is a segmented cross-sectional view of one embodiment of the invention herein;

FIG. 3 is a partial perspective view of one embodiment of the invention herein;

FIG. 4 is a partial cross-sectional view depicting an embodiment of invention described herein;

FIG. 5 is a partial cross-sectional view of another embodiment of the invention described herein;

FIG. 6 is a partial perspective view of one of the embodiments of the invention described herein;

DESCRIPTION OF BASIC STRUCTURE AND OPERATION OF FISHING REEL

Figure 1:
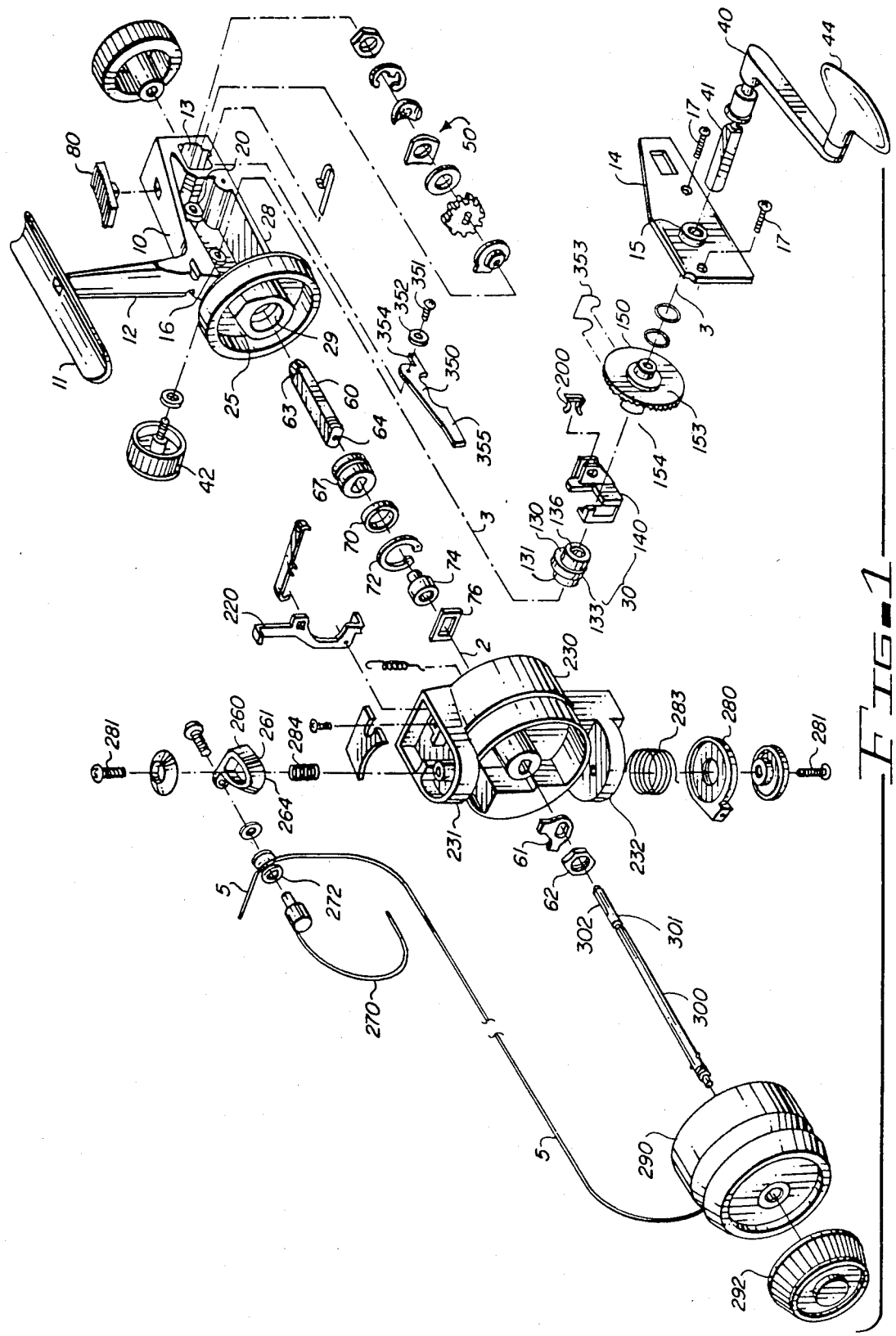
FIG. 1 is an exploded perspective view of the spinning style fishing reel containing the invention described herein.
Figure 8:
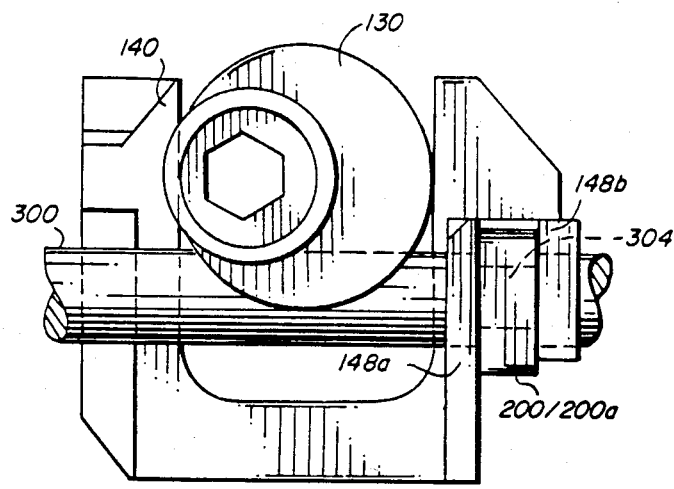
FIG. 8 is a partial elevation view depicting an embodiment of the invention described herein.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and, thus the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in bearing 16 that is part of the side of the housing 10 and coaxial with bearing 15 (but not shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever 76 are mounted on the pinion 60. The rotor 230 is mounted on the pinion assembly 60 in front of retainer 76 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis 2 of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 90 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A feature of this fishing reel is a self-centering bail mechanism that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

Figure 7:
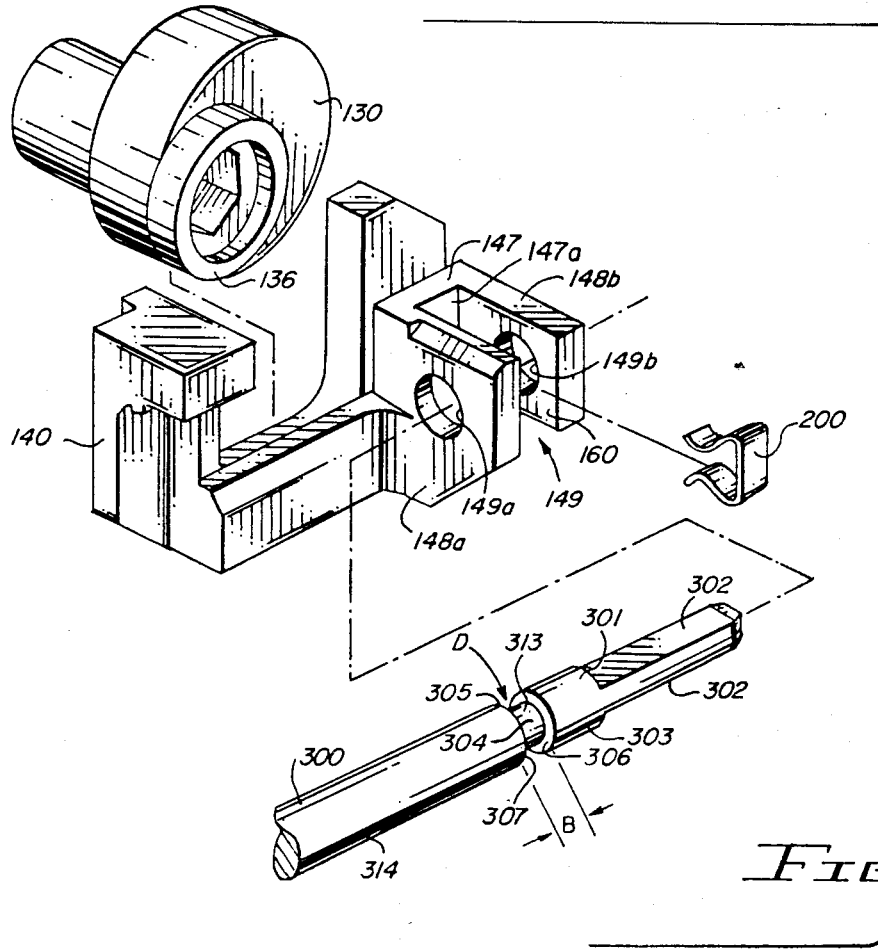
FIG. 7 is a partial exploded view incorporating an embodiment of the invention described herein.

In a preferred embodiment of the invention, and shown in FIG. 7, the central shaft 300 has a back drag end 301 that has milled opposed flats 302 adopted to function with the drag assembly 50 and an undercut groove 304 located near the flats 302. The groove 304 has an undercut diameter of "D" with a front groove side 305 and a back groove side 306. The circular periphery 307 of the groove 304 is smaller than the circular periphery 314 of the shaft 300. The shaft 300 has a diameter "A" which is larger than the diameter "D" of the groove 304. The groove 304 has a width 313 measured between the sides 305 and 306 and being defined by the dimension "B".

The oscillator cam assembly 130 is mounted in the gear case 28 in cooperative engagement with the oscillator slide 140. In several embodiments of the invention the slide 140 has an outwardly projecting bifurcated fork or clevis 147, best seen in FIGS. 3, 6 and 7. The fork or clevis 147 has two outwardly projecting lugs 148a and 148b with the inner walls or surfaces 160 defining a space 149 therebetween which is slightly greater than the dimension "B". Each of the lugs 148a and 148b have holes 149a and 149b therein that are substantially coaxial and slightly larger in diameter than "A". At the bottom of the space 149 defined by the surfaces 160 is a base portion 147a.

The center shaft 300 is positioned in the fork or clevis 147 such that the front side 305 and the back side 306 are substantially aligned with the inner walls or surfaces 160. A retainer clip 200 or 200a is pushed over the undercut groove 304 to keep the shaft 300 from sliding out of the holes 149a and 149b.

In one preferred embodiment of the invention clearly shown in FIGS. 2, 3 and 7, retainer clip 200 is depicted as having at least a partial triangular shape with a base 201 and resilient legs 202 and 203. The included angle θ between the base 201 and each of the legs 202 and 203 is less than 90° as shown in FIG. 2 and preferably in the range of 40° to 65°. The legs 202 and 203 and the base 201 are all springlike and made from material such as flat spring steel, spring tempered copper alloys or spring-quality plastic. The ends 210a and 210b of the legs 202 and 203 are separated by a space having a dimension "F" which is less than "D" as shown in FIG. 2. The length of the base 201 and the legs 202 and 203 is greater than the shaft 300 diameter "A". In positioning the clip 200 on the undercut groove 304, the ends 210a and 210b spring out allowing the clip to snap over the undercut diameter "D". Each leg 202 and 203 has a tang 204 and at the intersection thereof is a radius 211 which helps facilitate snapping the clip 200 on the undercut groove 304.

In the embodiment of the invention, as shown in FIG. 2, the base 201 and the legs 202 and 203 have perpendicular bisectors 205a, 205b, and 205c respectively that meet near a common area 206 close to the cross-sectional center of the undercut groove 204. The three perpendicular bisectors 205a, 205b and 205c have contact points at 212 on the groove 304 that form an included angle "M" that is greater than 200° insuring that the clip 200 fits sufficiently around the periphery 307 of the undercut groove 304 so that the clip 200 will not come loose. When the slide 140 reciprocates back and forth, the sides 305 and 306 push axially on the clip sides 209a and 209b which in turn push against the inner walls or surfaces 160 causing the shaft 300 to reciprocate. This cooperative relationship between the clip 200 and the lugs 148a and 148b prevents the shaft 300 from being pushed through the holes 149a and 149b.

In another embodiment of the invention, retainer clip 200a, as shown in FIGS. 5 and 6, has a base portion 213 and two bifurcated legs 214 and 215 that are separated by centrally oriented hole 216 and slot 217. At the open ends 214a and 215a of the legs 214 and 215 there are chamfers 219 that connect the ends with the slot 217. The base 213 and the legs 214 and 215 are each larger than the shaft 300 diameter "A". The clip 200a has sides 218a and 218b that are spaced apart a distance slightly less than the groove 304 width "B". The clip 200a is preferably made from a tough resilient shear-resistant plastic material sufficient for the legs 214 and 215 to expand over the groove 304 and immediately thereafter snap back or retract to a position similar to that shown in FIG. 5. Obviously, the base 213 also must have some resiliency or spring back. When the clip 200a is in place over the groove 304 which, in turn, is in position between the legs 148a and 148b, the shaft 300 is secured to the slide 140 such that when the slide 140 reciprocates back and forth so does the shaft 300. As can be seen in FIG. 5, the clip 200a surrounds a substantial portion of the groove 304.

It has been found that the clips 200 or 200a can be slightly loose on the groove 304 thus permitting the shaft 300 to rotate without impairing the reciprocating motion imparted to the shaft 300. The tangs 204 of the clip 200 or the end of the legs 214a or 214b of the clip 200a contact the bottom 147a of the fork 147 thereby preventing the clips 200 or 200a from rotating when the shaft 300 rotates.

Figure 9:
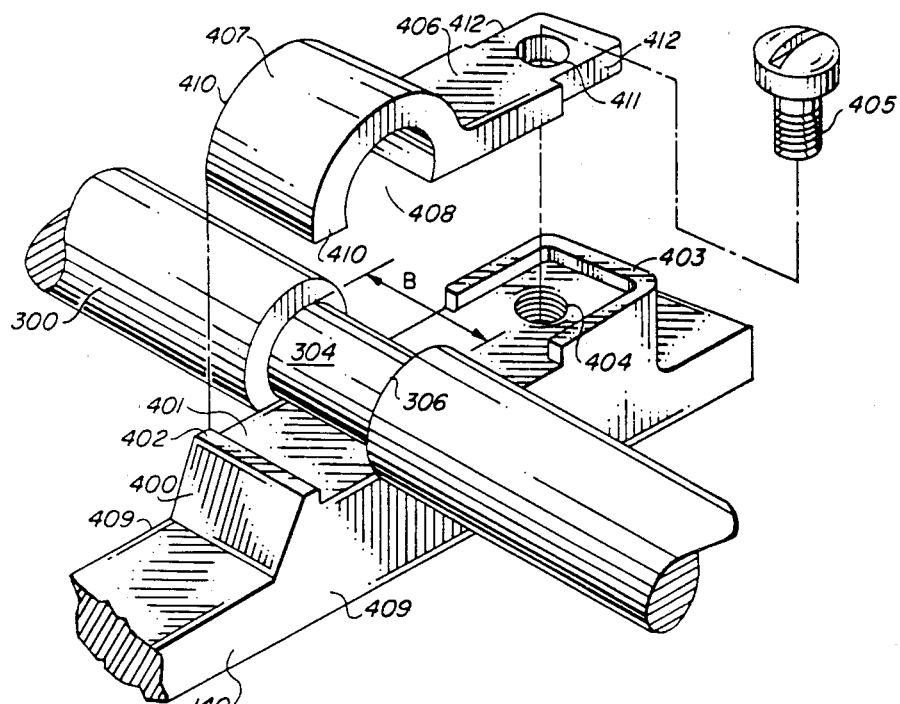
FIG. 9 is a partial perspective view showing an embodiment of the invention described herein; and, FIG. 10 is a partial side elevation view of the embodiment of the invention shown in FIG. 9.
Figure 10:
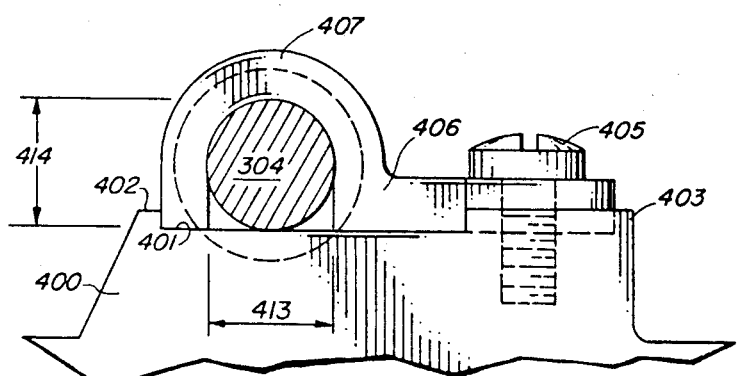

In still a further embodiment of the invention shown in FIGS. 9 and 10, the slide 140 has a side projection 400 extending outwardly in the same manner as the bifurcated fork or clevis 147. The projection 400 has a portion 401 slightly less in width than "B", a positioning lip 402 and a positioning flange 403. A threaded hole 404 is partially surrounded by the flange 403. The groove 304 of the shaft 300 straddles the projection 400 with the front side 305 and the back side 306 overlapping the portion 401. A strap 406 having a hub section 407 with a cutout portion 408 is positioned over the undercut groove 304. The cutout 408 has a width 413 and a height 414 that are both very slightly larger than "B". Two cutback portions 412 permit the strap 406 to be received and positioned by the flang 403. Hole 411 permits the strap 406 to be tightly secured to the projection 400 by means of screw 405. Obviously, other means for securing the strap to the projection 400 may be utilized, but the screw 405 has been found to be the most convenient. In operation, when the slide 140 reciprocates, the projection sides 409 and the hub sides 410 bear against the groove sides 305 and 306 to impart the reciprocating motion to the shaft 300. Since the width 411 and the height 412 are slightly greater than "B" the shaft 300 is free to rotate relative to the slide without impairing the reciprocating motion.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

What is claimed is:

1. In a fishing reel having a housing with a front end and a back end, a center shaft mounted on the housing with a back end projecting into the housing, the shaft generally having a diameter "A" with a groove defining an undercut diameter on the shaft located near the back end, the diameter of the undercut being "D" which is smaller than diameter "A" and the width of the undercut groove being "B", the undercut groove having a periphery less than the periphery of the shaft, means for imparting reciprocating motion to the shaft including a reciprocating oscillator slide having a bifurcated fork secured thereto, the fork having first and second lugs with inner walls and a space between the inner walls having a dimension slightly larger than width "B", the lugs have coaxial aligned holes with each hole having a diameter slightly larger than diameter "A", the shaft being slip fitted into the holes in the lugs with the undercut diameter being positioned between the inner walls, an improved means for securing the shaft to the oscillator shaft comprising:

a retainer clip having a base and two integrally formed spaced apart legs extending from the base, each leg having an exterior end, the base and legs having common sides, and defining a hole and a slot separating the legs with the hole near the center of the clip and the slot connecting the hole and the exterior ends, the legs and base being longer than the diameter "A", the hole having a diameter slightly larger than the diameter "D" of the undercut and the slot having a width "F" smaller than the diameter "D", the clip having a thickness defining the distance between the common sides as being slightly less than the width "B" of the undercut groove, the clip made from a material permitting the legs to expand outwardly a sufficient amount to permit positioning the clip in the undercut groove.

2. In a spinning reel having a housing with a front spool end and a back crank drive assembly end, a shaft mounted in the housing with one end projecting into the housing, means within the housing for imparting reciprocating motion to the shaft including a reciprocating oscillator slide, an improved means for securing the shaft to the slide comprising:

(a) the shaft having a diameter "A" and an undercut groove near the one end, the undercut groove having sides and an undercut with the undercut having a diameter "D" and a width between the sides being the dimension "B", (b) a clevis carried by the slide and projecting outwardly therefrom having two spaced apart lugs, each lug having a hole slightly larger in diameter than diameter "A", each lug having an inner surface which is spaced from the inner surface of the outer lug by an amount slightly greater than the dimension "B", (c) the shaft is slip fit into the holes in the lugs with the undercut groove being positioned in the space between the lugs and the groove sides being substantially aligned with the inner surfaces of the lugs, (d) a retainer clip having a base and two integrally formed spaced apart legs, each leg having an exterior end, the base and legs having common exterior side surfaces and define a hole and a slot separating the legs with the hole near the center of the clip and the slot connecting the hole and the exterior ends, the clip being made from resilient material, the hole having a diameter slightly larger than the diameter "D" and the slot having a width "F" which is smaller than the diameter "D", the width of the clip between the common side surfaces being slightly less than the dimension "B", the clip located in the space between the lugs on the slide and mounted on the undercut diameter by the resilient expansion and concomitant retraction of the exterior ends, the legs and the base being longer than the diameter "A" whereby the sides of the groove bear against the exterior side surfaces which in turn bear against the inner walls preventing relative sliding movement between the shaft and the slide.

3. The clip of claim 1 or 2 wherein the legs and base of the clip extend beyond the diameter "A" of the shaft to prevent the shaft from moving relative to the lugs and to the slide.

4. The clip of claim 1 or 2 wherein the diameter of the holes in the lugs are slightly larger than the dimension "B" to permit the shaft to rotate relative to the lugs.

5. The clip of claim 1 or 2 wherein each side of the slot in the clip has a chamfer near the exterior end to facilitate assembly with the undercut groove.

6. The clip of claim 1 or 2 wherein the material of the clip is resilient plastic.

7. The clip of claim 1 or 2 wherein the shape of the exterior ends of the legs of the clip prevents the clip from rotating relative the lugs.

* * * * *